(12) United States Patent
Pelli et al.

(10) Patent No.: US 12,721,324 B2
(45) Date of Patent: Sep. 1, 2026

(54) OYSTER CAGE FLIPPING SYSTEM

(71) Applicant: University of Georgia Research Foundation, Inc., Athens, GA (US)

(72) Inventors: John E. Pelli, Savannah, GA (US); Robert E. Hein, Palacios, TX (US)

(73) Assignee: University of Georgia Research Foundation, Inc., Athens, GA (US)

(*) Notice: Subject to any disclaimer, the term of this patent is extended or adjusted under 35 U.S.C. 154(b) by 0 days.

(21) Appl. No.: 18/837,052

(22) PCT Filed: Feb. 21, 2023

(86) PCT No.: PCT/US2023/062919
§ 371 (c)(1),
(2) Date: Aug. 8, 2024

(87) PCT Pub. No.: WO2023/159241
PCT Pub. Date: Aug. 24, 2023

(65) Prior Publication Data

US 2025/0134075 A1 May 1, 2025

Related U.S. Application Data

(60) Provisional application No. 63/312,249, filed on Feb. 21, 2022.

(51) Int. Cl.
*A01K 61/54* (2017.01)
*A01K 61/55* (2017.01)

(52) U.S. Cl.
CPC .............. *A01K 61/55* (2017.01); *A01K 61/54* (2017.01)

(58) Field of Classification Search
CPC ........ A01K 61/50; A01K 61/54; A01K 61/55; A01K 61/60; A01K 61/65

(Continued)

(56) References Cited

U.S. PATENT DOCUMENTS 3,909,971 A * 10/1975 Wilde .................... A01K 61/54 119/237
4,704,990 A * 11/1987 Moxham ................ A01K 61/54 119/239

(Continued)

FOREIGN PATENT DOCUMENTS

KR 10-1483738 B1 1/2015
WO 2018074668 A1 4/2018

OTHER PUBLICATIONS

International Search Report and Written Opinion in International Application No. PCT/US2023/062919, mailed Jun. 23, 2023.

*Primary Examiner* — David J Parsley
(74) *Attorney, Agent, or Firm* — THOMAS | HORSTEMEYER, LLP

(57) ABSTRACT

Systems and methods for flipping floating oyster cages are disclosed. The system includes a support structure that when in a deployed position, the second end is submerged in water and the first end remains above water, a carriage configured to travel along the support structure and to engage with a floating cage, and a lifting device configured to move the carriage. The carriage includes a carriage guide moveably attached to the support structure, a lift arm attached to the carriage guide, a balance bar attached at the distal end of the lift arm, and a flipping apparatus. The flipping apparatus includes a carriage table coupled to the balance bar at the distal end of the lift arm such that the carriage table rotates about a rotation axis of the balance bar, where the carriage table includes a lifting frame adapted to allow water to flow through the lifting frame.

12 Claims, 8 Drawing Sheets

(58) Field of Classification Search
USPC .......................................... 119/234, 239, 240
See application file for complete search history.

(56) References Cited

U.S. PATENT DOCUMENTS

| | | | | |
|---|---|---|---|---|
| 10,653,119 | B2 * | 5/2020 | Goudey | A01K 61/55 |
| 11,083,175 | B2 * | 8/2021 | Pannell | A01K 61/54 |
| 11,516,996 | B1 * | 12/2022 | DePaola | A01K 61/60 |
| 11,737,433 | B2 * | 8/2023 | Sampson | A01K 61/54 119/200 |
| 12,102,066 | B1 * | 10/2024 | Rudner | A01K 61/60 |
| 2014/0083365 | A1 * | 3/2014 | Mcshane | A01K 61/54 119/234 |
| 2020/0396968 | A1 * | 12/2020 | Docker | A01K 61/55 |
| 2021/0000084 | A1 * | 1/2021 | Sampson | A01K 61/50 |

* cited by examiner 100
504
506
500
506
160
172
156
158
162
136
148
108
146
128
178
134
124
110

100
502
148
118
162
136
164
156
172
160
158
166
108
146
128
178
134
124
110

732
740
702
786
738
784
736
788
730
724
302
302
302
772

102
108
106
146
144
200
128
126
112
202
122
120
134
110

776
788
748
748
780

700
1104
772
730
506
738
732
500
506
784
748
108
146
128
724
110
134
1102
738
772
730
732
736
784

OYSTER CAGE FLIPPING SYSTEM

CROSS-REFERENCE TO RELATED APPLICATIONS

This application is a U.S. national phase application under 35 U.S.C. 371 of International Patent Application No. PCT/US2023/062919, filed on Feb. 21, 2023, which claims the benefit of and priority to U.S. Provisional Application No. 63/312,249, filed on Feb. 21, 2022. Each application is incorporated herein by reference in its entirety.

BACKGROUND

Mollusks are small aquatic animals with soft bodies and hard shells, including oysters, clams, scallops, etc. The global market for mollusks reached $36 billion in 2017, and is expected to grow to $49 billion in 2022. In 2016, U.S. shellfish farmers produced 37 million pounds of oysters.

BRIEF DESCRIPTION OF THE DRAWINGS

Many aspects of the present disclosure can be better understood with reference to the following drawings. The components in the drawings are not necessarily drawn to scale, with emphasis instead being placed upon clearly illustrating the principles of the disclosure. In the drawings, like reference numerals designate corresponding parts throughout the several views.

SUMMARY

Figure 1:
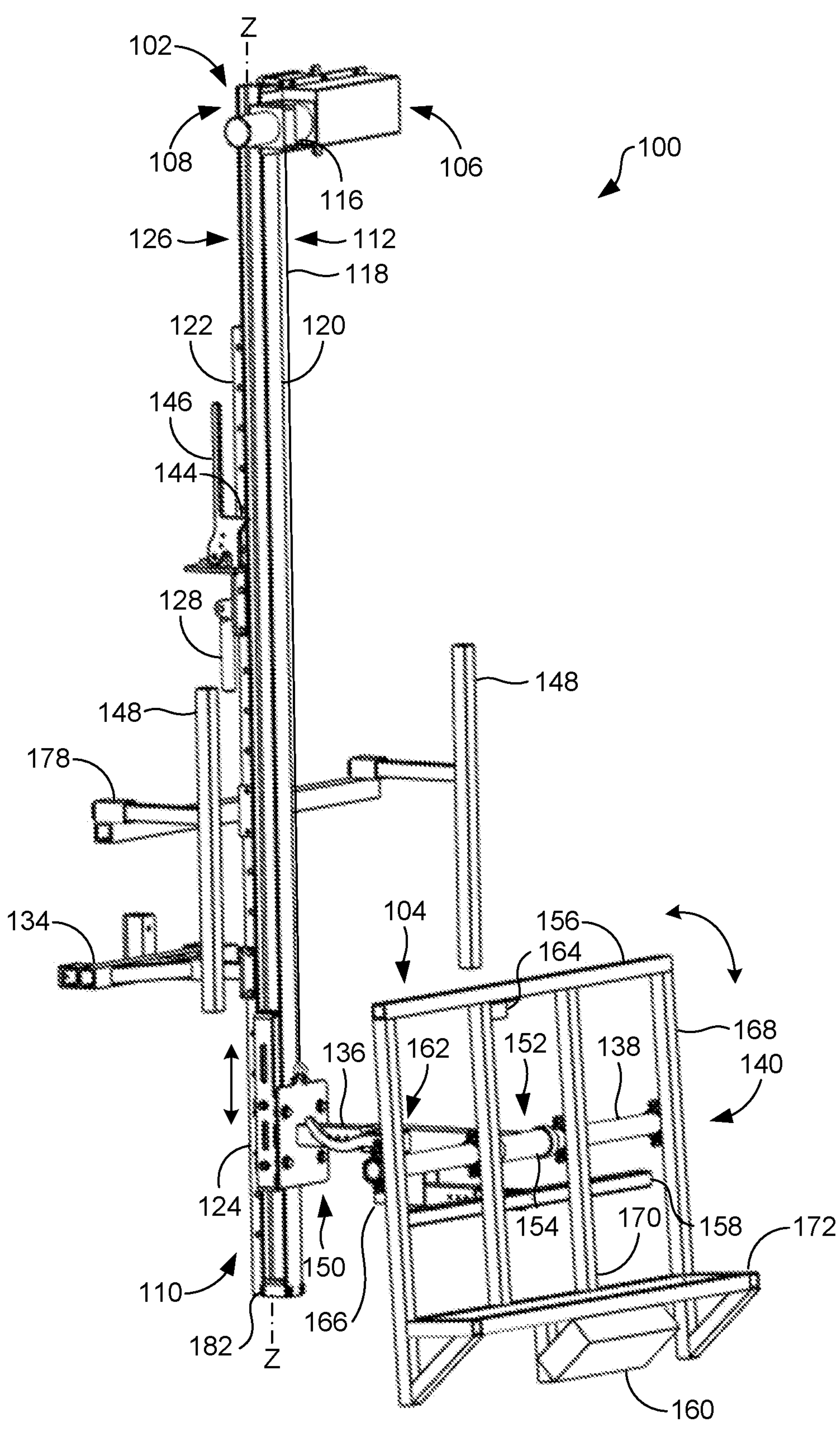
FIG. 1 illustrates an example oyster cage flipping system according to various aspects of the embodiments of the present disclosure.

Aspects of the present disclosure are related to an oyster cage flipping system for inverting or turning over oyster cages floating in water, and method of use thereof. For example, the oyster cage flipping system can be mounted on a boat or other watercraft and used in aquaculture.

In one aspect, among others, an oyster cage flipping system comprises a support structure extending along a main axis, the support structure having a first end and a second end, the support structure can be deployed in water such that, when in a deployed position, the second end is submerged in water and the first end remains above water; a carriage can travel along a first side of the support structure and to engage with a cage floating in water, and a lifting device can move the carriage. In various aspects, the carriage can comprise a carriage guide moveably attached to the support structure on the first side of the support structure, a lift arm attached to the carriage guide at a proximal end of the lift arm extending in a direction away from the first side of the support structure, a balance bar attached at the distal end of the lift arm, a middle section of the balance bar attached such that the balance bar extends on both sides of the lift arm is arranged substantially perpendicular to the lift arm and substantially perpendicular to the main axis of the support structure, and a flipping apparatus coupled to the lift arm. In various aspects, the flipping apparatus can comprise a carriage table coupled to the balance bar at the distal end of the lift arm such that the carriage table rotates about a rotation axis of the balance bar, the carriage table comprising a lifting frame adapted to allow water to flow through the lifting frame; and a carriage foot comprising a frame that extends in a direction substantially perpendicular to the plane of the carriage table and that can engage with at least an edge of the cage. In various aspects, when the oyster cage flipping system is deployed, the carriage table can move from a release position, where the carriage is not engaged with the cage, to a lifting position, where the carriage is engaged with the cage. In various aspects, the carriage foot can further comprise a flotation device. In various aspects, when deployed in water, the floatation device floats upward causing the carriage table to move from the release position to the lifting position. In various aspects, the carriage can further comprise a latch and a latch plate suitable to secure the carriage table in the lifting position for lifting the cage. In various aspects, the lift arm can be an adjustable telescoping arm.

In various aspects, the oyster cage flipping system can further comprise guide bars that extend outward on the first side of the support structure, the guide bars can center and stabilize the cage. In various aspects, the oyster cage flipping system can further comprise a boat attachment coupler comprising a first portion of the coupler attached to the support structure and a second portion of the coupler is attached to a portion of a boat, the coupler can detachably attach the support structure to the boat in a secure manner, the coupler can allow movement of the support structure between a stowed position to the deployed position. In various aspects, the oyster cage flipping system can further comprise a boat brace attached to the support structure on a second side of the support structure opposite to the first side of the support structure. In various aspects, the boat brace has a portion that is adjustable. In various aspects, the support structure can comprise a support beam to which the carriage guide is moveably attached. In various aspects, the support structure can further comprise an adjustment rail attached to the support beam on a second side of the support structure opposite to the first side of the support structure, wherein the first portion of the coupler, a boat brace, or both can be detachably attached to the adjustment rail. In various aspects, the lifting system can comprise a winch and a cable, the winch attached to the first end of the support structure, the cable retractably extending from the winch and attached to the carriage guide, the cable having a length to extend the carriage guide to a carriage stop position a distance from the second end of the support structure. In various aspects, the lifting system can further comprise a clutch, the clutch can be engaged or disengaged, when the clutch is engaged, the winch operates to retract the cable and move the carriage toward the first end of the support structure, when the clutch is disengaged, the tension on the cable is released and the carriage allowed to drop into the water to the bottom or second end of the support structure as the cable free wheels on the winch. In various aspects, the oyster cage flipping system can further comprise a carriage stop block positioned at a catch distance from the first end of support structure, the carriage stop block can prevent the carriage from lowering, when the carriage guide is positioned at the stop block, tension is released from the cable, allowing the winch to be disengaged. In various aspects, the oyster cage flipping system can further comprise a lever with a catch, where the catch stops movement of the carriage at a catch distance from the winch and allows an operator to disengage the clutch.

In another aspect, among others, a method for flipping a floating oyster cage using an oyster cage flipping system, the method comprises positioning a carriage lowered into the water beneath the floating cage and centering the cage over the carriage table; activating the lifting system to raise the carriage toward the cage floating in the water; contacting the floating cage the carriage table, the carriage table being latched in the lifting position as the carriage continues to rise; stabilizing the cage against the guide bars as the as the carriage lifts the cage out of the water; lifting the cage out of the water; releasing a latch to allow the carriage table to pivot to a release position; and flipping the cage into the water to an inverted position.

In various aspects, after the cage flips, the method can further comprise stopping upward movement of the carriage the rise of the carriage after passing the carriage stop block. In various aspects, the method can further comprise disengaging the clutch of the lifting system to allow the carriage to drop into the water. In various aspects, the method can further comprise adjusting the length of the carriage table to correspond with the size of the cage. In another aspect, among others, a system comprising: a support structure extending along a main axis, the support structure having a first end and a second end, the support structure can be deployed in water such that, when in a deployed position, the second end is submerged in water and the first end remains above water; a carriage can travel along a first side of the support structure and to engage with a cage floating in water, and a lifting device can move the carriage.

In various aspects, the carriage can comprise a carriage guide moveably attached to the support structure on the first side of the support structure, a lift arm attached to the carriage guide at a proximal end of the lift arm extending in a direction away from the first side of the support structure, a balance bar attached at the distal end of the lift arm, a middle section of the balance bar attached such that the balance bar extends on both sides of the lift arm is arranged substantially perpendicular to the lift arm and substantially perpendicular to the main axis of the support structure, and a flipping apparatus coupled to the lift arm. In various aspects, the flipping apparatus can comprise a flip arm pivotably attached at the distal end of the lift arm, the flip arm can rotate about a rotation axis that is substantially parallel to the balance bar, a carriage wheel attached to a first end of the flip arm, the carriage wheel can rotate about a wheel axis that is substantially parallel to the axis of the balance bar, and a carriage foot comprising a frame that extends in a direction substantially perpendicular to the flip arm and that can engage with at least an edge of the cage. In various aspects, when the oyster cage flipping system is deployed, the flip arm can move from a release position, where the carriage is not engaged with the cage, to a lifting position, where the carriage is engaged with the cage. In various aspects, when in the release position, the carriage foot extends in a direction away from the first side of the support structure and in the lifting position, the carriage foot is substantially parallel to the support structure. In various aspects, the lift arm is an adjustable telescoping arm.

In various aspects, the oyster cage flipping system can further comprise guide bars that extend outward on the first side of the support structure at an angle. In various aspects, the oyster cage flipping system can further comprise a boat attachment coupler comprising a first portion of the coupler attached to the support structure and a second portion of the coupler is attached to a portion of a boat, the coupler can detachably attach the support structure to the boat in a secure manner, the coupler can allow movement of the support structure between a stowed position to the deployed position. In various aspects, the oyster cage flipping system can further comprise a boat brace attached to the support structure on a second side of the support structure opposite to the first side of the support structure. In various aspects, the boat brace has a portion that is adjustable. In various aspects, the support structure can comprise a support beam to which a carriage guide is moveably attached. In various aspects, the support structure can further comprise an adjustment rail attached to the support beam on a second side of the support structure opposite to the first side of the support structure, wherein the first portion of the coupler, a boat brace, or both can be detachably attached to the adjustment rail. In various aspects, the lifting system can comprise a winch and a cable, the winch attached to the first end of the support structure, the cable retractably extending from the winch and attached to the carriage guide, the cable having a length to extend the carriage guide to a carriage stop position a distance from the second end of the support structure. In various aspects, the lifting system can further comprise a clutch, the clutch can be engaged or disengaged, when the clutch is engaged, the winch operates to retract the cable and move the carriage toward the first end of the support structure, when the clutch is disengaged, the tension on the cable is released and the carriage allowed to drop into the water to the bottom or second end of the support structure as the cable free wheels on the winch.

In various aspects, the oyster cage flipping system can further comprise a carriage stop block positioned at a catch distance from the first end of support structure, the carriage stop block can prevent the carriage from lowering, when the carriage guide is positioned at the stop block, tension is released from the cable, allowing the winch to be disengaged. In various aspects, the oyster cage flipping system can further comprise a lever with a catch, where the catch stops movement of the carriage at a catch distance from the winch and allows an operator to disengage the clutch.

In another aspect, among others, a method for flipping a floating oyster cage using an oyster cage flipping system, the method comprising: positioning a floating cage over a carriage lowered into the water and centering the cage; activating the lifting system to raise the carriage toward the cage floating in the water; contacting the floating cage with the carriage wheel attached to the flip arm causing the flip arm to pivot from the release position to the lifting position as the carriage continues to rise; catching the outside edge of the cage with the flip arm is fully extended and in the lifting position as the carriage lifts the cage out of the water; lifting the cage to contact an inside top edge of the cage with the guide bars which push the cage away from the boat and toward the flip arm as the carriage continues to rise; pushing the cage away from the boat by guide bars and turning the cage as the cage passes a balance point on the carriage such that the outside edge of the cage begins to drop, starting the flip; supporting the outside edge of the cage by the flip arm as the cage begins to flip, which allows the cage to stand up substantially perpendicular to the surface of the water; and flipping the cage into the water in an inverted position.

In various aspects, after the cage flips, the method can further comprise stopping upward movement of the carriage the rise of the carriage after passing the carriage stop block. In various aspects, the method can further comprise disengaging the clutch of the lifting system to allow the carriage to drop into the water. In various aspects, the method can further comprise adjusting the length of the lift arm to correspond with the size of the cage.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims. In addition, all optional and preferred features and modifications of the described embodiments are usable in all aspects of the disclosure taught herein. Furthermore, the individual features of the dependent claims, as well as all optional and preferred features and modifications of the described embodiments are combinable and interchangeable with one another.

DETAILED DESCRIPTION

Most oyster aquaculture operations in the USA, and other parts of the world, use the floating cage method to grow oysters. And it is recommended to flip the cages up from time to time (e.g. biweekly) for 24 hours to allow the oysters to dry-out and kill any fouling organisms. Currently, most farmers flip the cages manually either by two people in the boat with gaffs or one person getting into the water to use their body weight to roll it over as the person climbs up one side of the cage.

Disclosed herein is an oyster cage flipping system configured to be installed on a boat and to be hung off one side of the boat during the flipping exercise. The boat can run at normal speed and only one person is needed to set up and operate the oyster cage flipping system. The system can be moved from a deployed to stowed position when not in use, or can be detached from the boat.

The oyster cage flipping system is configured to flip oyster cages used in the aquaculture industry around the world. Most oyster aquaculture operations in the USA use the floating cage method to grow oysters. In the USA, a common type of oyster cage is about three foot wide, about six foot long, and about one foot thick having six compartments in two levels. For example, each cage can hold six oyster bags with one bag to each of the six compartments, three up and three down. While this is one example of an oyster cage, other types of oyster cages are used in the USA and worldwide.

For example, a cage can be secured to one or more floats or floatation units. The floats of the cage can be adapted such that the cage floats in mainly one of two stable positions, such that in an up position, the cage is floating above water and exposed to air, and in a down position, the cage is floating submerged in the water. Flipping the cage is turning over the cage from an initial state such that the side, which was initially submerged is exposed, and the opposite side, which was initially exposed is submerged. Flipping the cage into the up position for twenty-four hours allows the oysters to dry-out killing any fowling organisms. Currently, one method to flip oyster cages to the up position is manually, for example, by two people in the boat with gaffs. Another method is for a person to get into the water and physically use body weight to roll the cage over as the person climbs up one side.

The oyster cage flipping system described herein was designed to flip cages to the up position. Flipping the cages to the down position is much faster by hand because a flipped-up cage is top heavy and tends to roll on its own once the motion is started. However, in some examples, the oyster cage flipping system can be used to invert the cage regardless of the initial position being the up position or the down position. In some examples, the cages can also be tied together, end to end, in a line with a space between cages. For example, the line can include about 50 cages. The oyster cage flipping system deployed on a boat allows an operator to move down the line on the boat flipping each cage in the line.

The oyster cage flipping system is configured to be mounted on a boat and can be deployed into the water, hanging off one side of the boat, during the flipping exercise and then retracted back into the boat when the flipping is complete for the day. By deploying the oyster cage flipping system only when in use, the boat can run at normal speed between the hill and the work location saving time. The oyster cage flipping system can be set up and operated by one person. As can be understood the term boat used herein is considered a generalized term for a watercraft and can include boats, barges, floating platforms, and the like.

In FIG. 1, one example of the oyster cage flipping system 100 is shown. The oyster cage flipping system 100 can include a support structure 102, a carriage 104 (also called a lift/flip carriage herein), and a lifting device 106. The support structure 102 extends along a main axis (Z) and has a first end 108 and a second end 110. The support structure 102 configured to be deployed in water (not shown) such that, when in a deployed position, the second end 110 is submerged in water and the first end 108 remains above water. The carriage 104 can travel along a first side 112 of the support structure 102. The carriage 104 is configured to engage with a cage 500 (FIG. 5B) floating in the water and suitable to lift the cage 500 out of the water. The lifting device 106 is coupled to the support structure 102 at the first end 108. The lifting device 106 is configured to move the carriage 104 along a first side 112 of the support structure 102. As shown in FIG. 1, the lifting device 106 can include a winch 116 with a strap or cable 118 attached to the carriage 104. The lifting device 106 can also include a solenoid activated disengagement of the winch 116.

Figures 2, 3, 4:
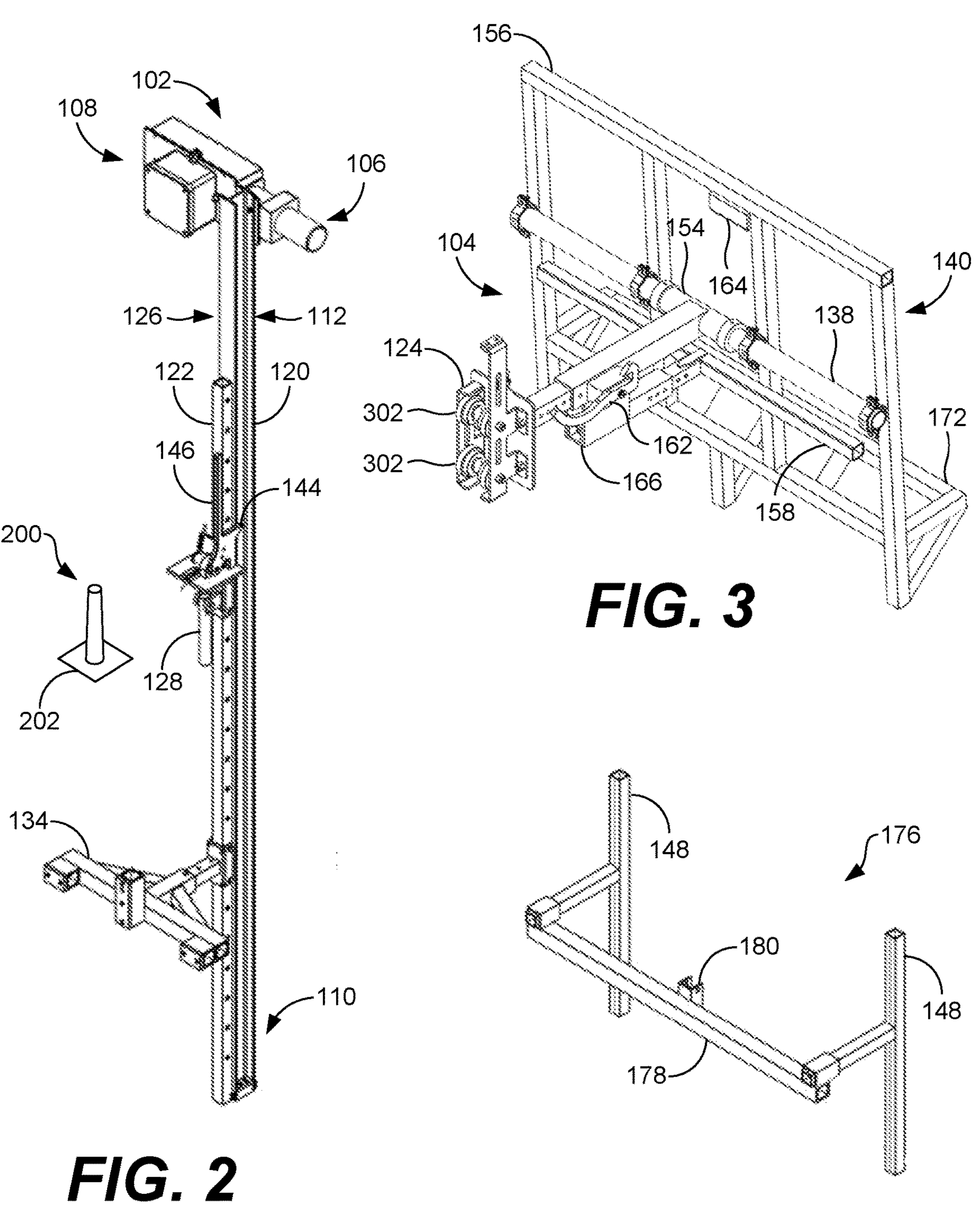
FIG. 2 illustrates the support structure of the example oyster cage flipping system of FIG. 1 according to various aspects of the embodiments of the present disclosure.
FIG. 3 illustrates the carriage of the example oyster cage flipping system of FIG. 1 according to various aspects of the embodiments of the present disclosure.
FIG. 4 illustrates the guide bars of the example oyster cage flipping system of FIG. 1 according to various aspects of the embodiments of the present disclosure.

The support structure 102, also shown in FIG. 2, includes a support beam 120 and an adjustment rail 122 coupled to the support beam 120. In some examples, the support beam 120 can be an I-beam, for example, about 8 feet long. In some examples, the support beam 120 can have length selected for the particular boat to which it will be installed. In some examples, the length of the support beam 120 is related to the size and dimensions of the oyster cage 500. The support structure 102 is configured to be detachably attached to a boat, another water vehicle, or another structure. The support structure 102 having first and second ends. When deployed in water, the support structure 102 is configured to be substantially vertical with the first end 108 (considered the top) of the support structure 102, remaining above water and the second end 110 (considered the bottom), submerged in water. As shown in this example, the support beam 120 can be an I-beam or have an I-shape to facilitate the movement of a carriage guide 124 of the carriage 104. The carriage 104 is moveably attached to the support beam 120 on the first side 112 of the support structure 102.

The adjustment rail 122 can be attached to the support beam 120 on a second side 126 of the support structure 102 opposite to the first side 112 of the support structure 102 and does not interfere with the movement of the carriage 104 on the first side 112 of the support structure. The adjustment rail 122 is configured to detachably receive attachments adapted for the oyster cage flipping system 100, such as attachments for mounting, stability, or operation. The adjustment rail 122 can have a series of seats or attachment points configured to receive one or more attachments secured to the adjustment rail 122. The series of seats or attachment points being spaced such that the attachments can be detached and reattached at positions that allow the user to adjust the fit of the oyster cage flipping system 100 to the boat. The attachments can be mounted on the adjustment rail and secured with one or more fasteners. The adjustment rail 122 is configured to detachably attach at least a first coupler portion 128 of a coupler 200 (FIG. 2), a boat brace 134, a carriage release lever 146, and guide bars 148.

The oyster cage flipping system 100 may include a boat attachment coupler 200 to be used to mount the oyster cage flipping system 100 on a boat (not shown). The boat attachment coupler 200 may include a first coupler portion 128 of the boat attachment coupler 200 attached to the support structure 102 and a second coupler portion 202 (FIG. 2) of the boat attachment coupler 200 that is secured to a portion of a boat. In an example, the first coupler portion 128 of the boat attachment coupler 200 attached to the support structure can be an adjustable male attachment or pin and the second coupler portion 202 of the boat attachment coupler 200 attached to the boat can be a female attachment or seat configured to receive the pin. The first coupler portion 128 of the boat attachment coupler 200 can be detachably attached to the adjustment rail 122. The boat attachment coupler 200 can be configured to detachably attach the support structure 102 to the boat in a secure manner. The boat attachment coupler 200 can be configured to allow movement of the support structure 102 between a stowed position, where the oyster cage flipping system 100 is on the boat and removed from the water, to the deployed position, where the oyster cage flipping system 100 is deployed in the water. For example, the oyster cage flipping system 100 can pivot and/or rotate about the coupler 200 from a stowed position, where the support structure 104 is in a substantially horizontal position on the boat, to a deployed position, where the support structure 104 is in a substantially vertical position in the water.

The oyster cage flipping system 100 may include a boat brace 134 attached to the support structure 102 on a second side 126 of the support structure 102 opposite to the first side 112 of the support structure 102. The boat brace 134 can have a portion that is adjustable. The support structure 102 is configured to be detachably attached to a boat (not shown) via an attachment coupler 200, where one portion of the coupler 200 is attached to the support structure 102 and a second portion of the coupler 200 is attached directly or indirectly to the boat (not shown). The boat brace 134 can be detachably secured to the support structure 102 and the position of the boat brace 134 can be adjusted along the adjustment rail 122. The boat brace 134 is configured to abut against the exterior side of the boat to stabilize the support structure 102. The boat brace 134 can be detachably attached to the adjustment rail 122. In some examples, the oyster cage flipping system 100 can additionally be secured to the boat by a fastener, such as a bolt extending through a hole in the boat and secured by a nut.

As shown in the example of FIGS. 1 and 3, the carriage 104 of the oyster cage flipping system 100 can include a carriage guide 124, a lift arm 136, a balance bar 138, and a flipping apparatus 140. The carriage guide 124 can be moveably attached to the support structure 102 on the first side 112 of the support structure 102. The carriage guide 124 can have a plurality of wheels 302 (FIG. 3) to allow movement along the support structure 102. For example, the carriage guide 124 can have four wheels 302, where the carriage 104 straddles an I-shaped support beam 120 and a pair of wheels 302 is arranged on each side of the I-shaped support beam 120 to stabilize the carriage 104 and to allow movement of the carriage 104. The support structure 102 can have a lower carriage stop 182 located at the second end 110 of the support structure 102 to limit the carriage 104 from detaching from the support structure 102. The support structure 102 can have a carriage stop block 144 positioned at a catch distance from the first end 108 of support structure. The carriage stop block 144 can comprise a carriage release lever 146 with a catch, as shown in FIGS. 1 and 2.

The carriage 104, also shown in FIG. 3, can include the lift arm 136 attached to the carriage guide 124 at a proximal end 150 of the lift arm 136 extending in a direction away from the first side 112 of the support structure 102. In an example, the lift arm 136 can be telescoping and/or adjustable in length. The balance bar 138 is attached at the distal end 152 of the lift arm 136. A middle section 154 of the balance bar 138 is attached such that the balance bar 138 extends on both sides of the lift arm 136 which is arranged substantially perpendicular to the lift arm 136 and substantially perpendicular to the main axis (Z) of the support structure 102. For example, with respect the main axis (Z) of the support structure, the lift arm 136 can extends in a direction away from the support structure along or parallel to an x-axis and the balance bar can extend along or parallel to a y-axis.

Figures 5A, 5B:
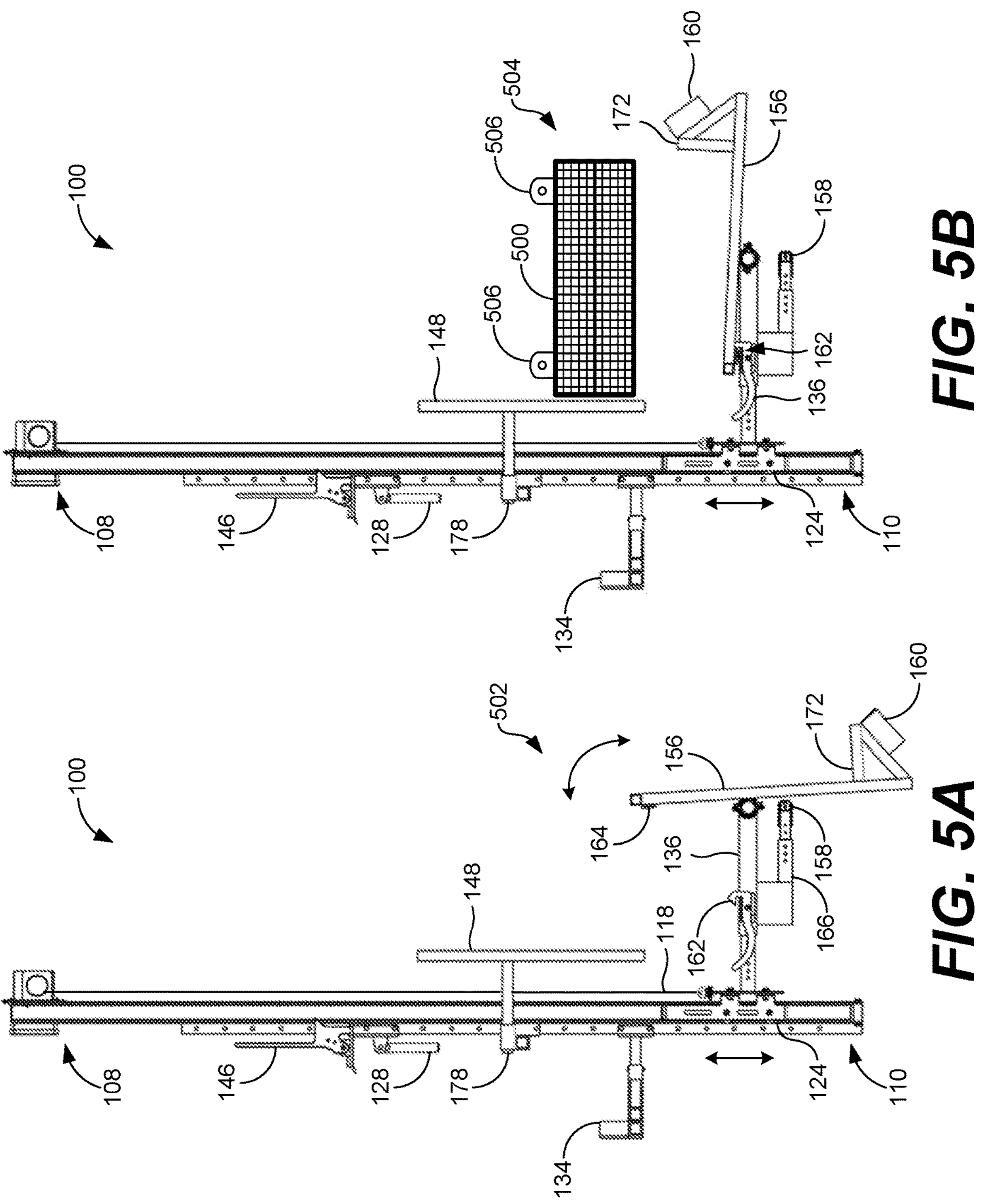
FIG. 5A illustrates the example oyster cage flipping system of FIG. 1 with the carriage table in a release position according to various aspects of the embodiments of the present disclosure.
FIG. 5B illustrates the example oyster cage flipping system of FIG. 1 with the carriage table in a lifting position and engaged with a cage according to various aspects of the embodiments of the present disclosure.

The flipping apparatus 140 can comprise a carriage table 156 coupled to the balance bar 138 at the distal end 152 of the lift arm 136 such that the carriage table 156 rotates about a rotation axis of the balance bar 138. As shown in FIGS. 5A and 5B, the carriage table 156 configured to move from at least a first position 502 (FIG. 5A), also called a release position herein, where the carriage table 156 is allowed to move freely, to a second position 504 (FIG. 5B), also called a lifting position herein, where the carriage table 156 is positioned substantially parallel to the lift arm 136 and suitable to engage the carriage 104 with the cage floating in water. The flipping apparatus 140 can also include a floatation device 160 to aid movement of the carriage table 156 from the release position to the lifting position when deployed in water. For example, when the oyster cage flipping system 100 is deployed, the carriage table 156 is configured to move from a release position, where the carriage is not engaged with the cage, to a lifting position, where the carriage is engaged with the cage. In some examples, the carriage 104 can include a latch 162 and a latch plate 164 to secure the carriage table 156 in the second position 504 for lifting the cage. The latch 162 can be attached to the lift arm 136 and the latch plate 164 can be attached to the carriage table 156 at a position to meet the latch 162 when the carriage table 156 is in the second position 504. The carriage 104 can also include a limit bar 158 coupled to the lift arm 136 via an auxiliary arm 166. The limit bar 158 can extend in a direction parallel to the balance bar 138 and be positioned to stop over rotation of the carriage table 156. For example, the auxiliary arm 166 can be telescoping and/or adjustable in length to allow a user to set the position of the limit bar 158.

The carriage table 156 includes a lifting frame 168 adapted to allow water to flow through the lifting frame 168. The lifting frame 168 can have a plurality of bars 170 positioned within the lifting frame 168 for additional support of the cage. For example, the carriage table 156 can be about 4 feet long and about 2.5 feet wide. In some examples, the width of the carriage table 156 is approximately the length of the balance bar 138. The flipping apparatus can include a carriage foot 172 comprising a frame attached to the lifting frame 168 that extends in a direction substantially perpendicular to the plane of the carriage table 156 and configured to engage with at least an edge of the cage. The floatation device 160 can be attached to the 172 and/or carriage table 156.

The oyster cage flipping system 100 may include a guide bar attachment 176, also shown in FIG. 4, that can be attached to the adjustment rail 122. The guide bar attachment 176 comprises guide bars 148 suitable to center and stabilize the cage being lifted out of the water. In some examples, the guide bars 148 may be considered bumpers. As shown in the example of FIGS. 1 and 4, the guide bar attachment 176 can include a pair of guide bars 148 extending from a brace 178 with a brace fitting 180 suitable to secure the guide bar attachment 176 to the adjustment rail 122 on the second side 126 of the support structure 102. The guide bars 148 extend from the brace 178 such that the guide bars 148 are positioned parallel to each other on the first side 112 of the support structure 102. In some examples, when attached to the adjustment rail 122, the guide bars 148 are substantially parallel to the main axis (Z) of the support structure 102. In some examples, when attached to the adjustment rail 122, the guide bars 148 extend at an angle or have additional dimension to provide planar support. In some examples, the brace 178 can be adjusted to position the guide bars 148 relative to the support structure 102.

FIGS. 5A and 5B illustrate the oyster cage flipping system 100 in a deployed position showing the carriage 104 with the flipping apparatus 140 in a first position 502 (FIG. 5A) and a second position 504 engaged with a cage 500 (FIG. 5B). In the example shown, the carriage 104 is positioned toward the second end 110 of the support structure 102 and can translate in both directions along the support beam 120. The carriage 104 can be lifted by the lifting device 106 including a winch 116 and a cable 118. The winch can have a cable 118 or strap configured to be connected to the carriage 104. For example, the winch 116 can be a 12-volt winch configured to dead lift 500 lbs. The winch 116 can be attached to the first end 108 of the support structure 102. The cable 118 can retractably extend from the winch 116 and be attached to the carriage guide 124. The cable 118 can have a length to extend the carriage guide 124 to a carriage stop position a distance from the second end of the support structure. The lifting device 106 can further include a clutch configured to be engaged or disengaged. When the clutch is engaged, the winch 116 operates to retract the cable 118 and move the carriage 104 toward the first end of the support structure. When the clutch is disengaged, the tension on the cable 118 is released and the carriage 104 is allowed to drop into the water to the bottom or second end of the support structure as the cable free wheels on the winch 116. The system 100 may include a carriage stop block 144 positioned at a catch distance from the first end of support structure. The carriage stop block 144 can be configured to prevent the carriage from lowering. When the carriage guide 124 is positioned at the carriage stop block 144, tension is released from the cable, allowing the winch 116 to be disengaged. The carriage stop block 144 can comprise a carriage release lever 146 with a catch, where the catch stops movement of the carriage 104 at a catch distance from the winch 116 and allows an operator to disengage the clutch.

As shown in FIG. 5A, the carriage table 156 is in the first position 502, or release position, and suitable to rotate freely about the axis of the balance bar 138. Rotation of the carriage table 156 can be limited by the limit bar 158 positioned beneath the balance bar 138. When deployed in the water, the floatation device 160 at the carriage foot 172 helps rotate the carriage table 156 as buoyant forces act on the floatation device 160. In some examples, the carriage 104 can be deployed into the water in the release position with the floatation device 160 aiding in the movement of the carriage table 156 to the second position 504, where the latch 162 is secured to the carriage table 156. In some examples, a user can secure the latch 162 such that the carriage table 156 in the lifting position prior to deploying the carriage 104 into the water.

As shown in FIG. 5B, when fully rotated to the second position 504, or lifting position, the carriage table 156 is suitable to engage with a cage 500. While the waterline is not shown in this figure, it can be understood that the carriage 104, as shown, is positioned underneath the cage 500 can be raised to engage with the floating cage. In this example, the cage 500 is shown with two floats 506 at the top of the cage, which is considered the "down" position, with the oysters in the cage submerged in water. The carriage 104 can translate towards the first end 108 of the support structure 102 with the cage 500 on the carriage table 156 in the second position and further stabilized by the guide bars 148. When the cage 500 has been lifted out of the water to a predetermined height, the latch 162 can be released by the user, so that the carriage table 156 freely moves to a release position, to release the cage 500 which is allowed to flip. For example, after the cage 500 has been flipped into the "up" position, the floats 506 are on the bottom of the cage, raising the oysters above water. Although this example shows floats 506 positioned on one side of the cage 500, the systems and methods disclosed here in can be relied on to flip cages of other sizes and configurations such that the cage can be inverted from a "down" position to an "up" position, or vice versa, from an "up" position to a "down" position.

Figure 6:
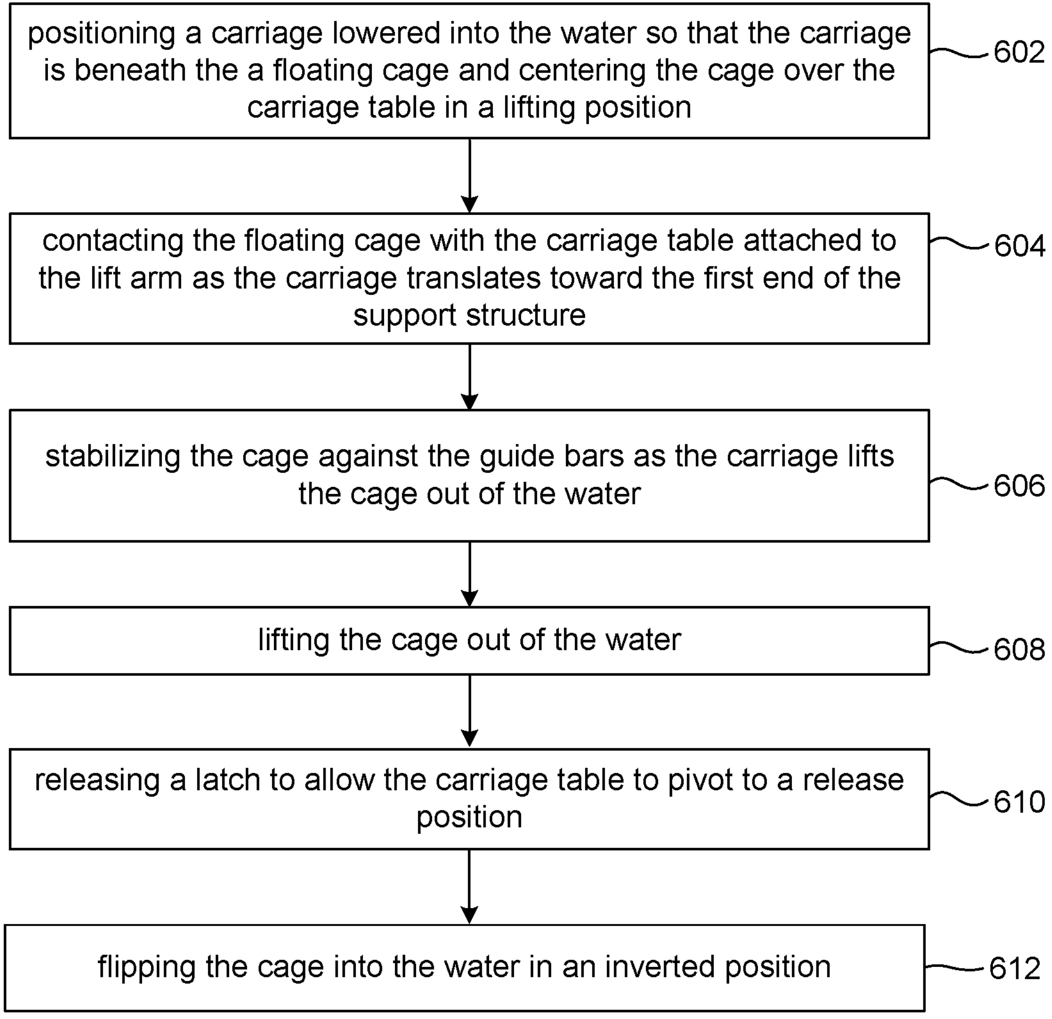
FIG. 6 illustrates an example method for flipping a floating oyster cage using the oyster cage flipping system of FIG. 1 according to various embodiments described herein.

An example method for flipping a floating oyster cage using the oyster cage flipping system 100 is shown in FIG. 6. At box 602, the method includes positioning a carriage 104, lowered into the water, beneath a cage 500 that is floating in water and centering the cage over the carriage table 156 set in a lifting position. In some examples, the carriage 104 is deployed in the water with the carriage table 156 in a release position, where the floatation device 160 attached to the carriage table 156 or carriage foot 172 is buoyant to move the carriage table 156 to the lifting position, thus engaging the latch 162. In some examples, the carriage 104 is deployed into the water with the carriage table 156 latched in the lifting position.

At box 604, the method includes contacting the cage 500 with the carriage table 156 attached to the lift arm 136 as the carriage 104 translates toward the first end 108 of the support structure 102. The cage 500 can be centered on the carriage table 156 and positioned such that an edge of the cage 500 is aligned with the carriage foot 172.

At box 606, the method includes stabilizing the cage 500 against the guide bars 148 as the carriage 104 lifts the cage 500 out of the water. The guide bars 148 can be configured for a particular cage 500 to provide consistent positioning. The guide bars 148 can be adjusted to a predetermined distance for a specific cage 500 further center the cage 500 so that it is squarely positioned on the carriage table 156. When the cage is consistently placed squarely on the table, the flipping of the cages is more consistent.

At box 608, the method includes lifting the cage 500 out of the water. The carriage 104 is suitable to carry the weight of the cage 500 with oysters to a predetermined height above the water by translating the carriage guide 124 along the support beam 120 towards the first end 108 of the support structure 102. In an example, the predetermined height may be set by a carriage stop block 144, which is adjustable.

At box 610, the method includes releasing the latch 162 to allow the carriage table 156 to pivot to the release position. With the carriage 104 at a height elevated above the water, releasing the carriage table 156 changes the position of the cage 500 and the center of gravity of the cage, such that the cage can flip over the carriage foot 172 and into the water in an inverted position, at box 612.

Figure 7:
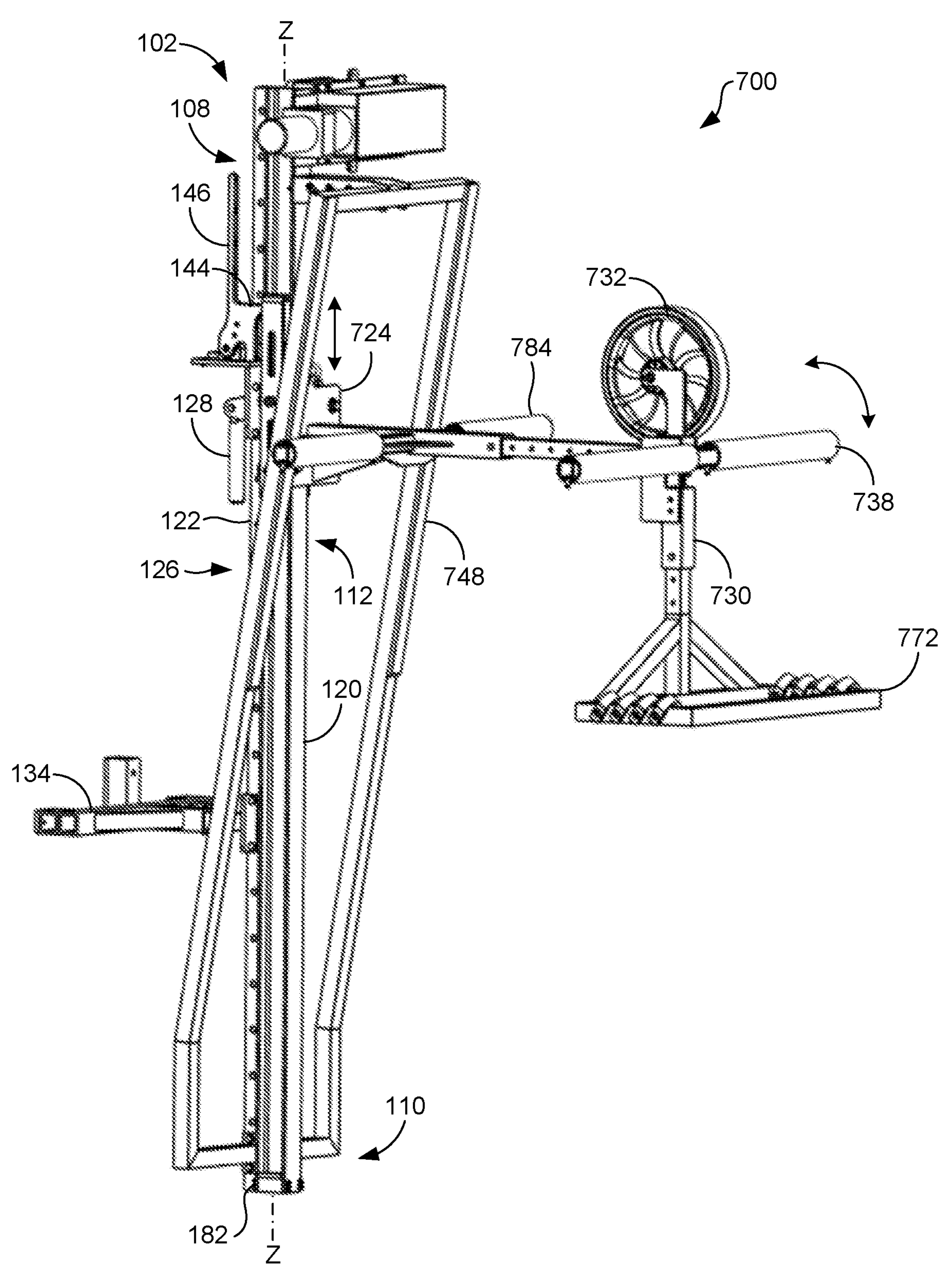
FIG. 7 illustrates another example oyster cage flipping system according to various aspects of the embodiments of the present disclosure.

Turning to FIG. 7, an example of the oyster cage flipping system 700 is shown. Similar to the oyster cage flipping system 100 shown in FIG. 1, the oyster cage flipping system 700 can include a support structure 102, a lift/flip carriage 704, and a lifting device 106. While the support structure 102 and the lifting device 106 can be the same as shown in the example of FIG. 1, the lift/flip carriage 704 can have a flipping apparatus 740 configured to engage with a cage 500 in a different manner. In the example shown in FIGS. 7 and 8, the support structure 102 includes a support beam 120, a lift/flip carriage 704 which rides on the support beam 120, and the lifting device 106. The lift/flip carriage 704, which will be described in greater detail, can include a carriage guide 724 adapted to travel along the support beam 120, a lift arm 736, and a flip arm 730 which can pivot with respect to the lift arm 736. The lifting device 106 can include a winch 116 with a strap or cable 118 attached to the carriage 704. As shown in this example, the support beam 120 can be an I-beam or have an I-shape to facilitate the movement of the carriage 704. The example system was built to be used on a twenty-one foot Carolina Skiff, but the oyster cage flipping system 700 can be adjusted to fit any boat. Also, outward leaning bars 748 can assist in guiding the oyster cage as it rotates to an inverted position. The lifting device 106 can also include a solenoid activated disengagement of the winch.

The oyster cage flipping system 700 can be removably mounted on a boat (not shown). When in a deployed position, a normal operation cycle would include the following method. First, an operator positions the floating cage 500 over the fully lowered lift/flip carriage 704 and centers the cage 500. Next, the operator presses the up switch which activates the lift/flip carriage 704. As the carriage 704 rises, the carriage wheel 732 makes contact with the bottom of the cage 500 which causes the flip arm 730 to rise and pivot about the balance bar 738. In some examples, the flip arm 730 is configured with a notch 786 and attached to the lift arm 736 at a pivot point 786, such that the flip arm 730 rotates about an axis parallel with the balance bar 738 at the pivot point 786 and where the notch is suitable to receive the balance bar 738 when in a lifting position. As the carriage 704 lifts the cage 500 out of the water, the flip arm 730 is fully extended and in position to catch the outside edge of the cage 500 facilitating the flip. As the carriage 704 continues to rise, lifting the cage 500 with the lift arm 736 and flip arm 730 engaged with the cage 500, the inside top edge of the cage comes in contact with two outward leaning bars 748. The outward leaning bars 748 then push the cage 500 away from the boat and toward the flip arm 730 as the carriage 704 continues to rise. At some point, as the cage 500 is pushed away from the boat by the two outward leaning bars 748, it passes the balance point on the carriage 704 and the outside edge of the cage 500 begins to drop, starting the actual flip. As the cage 500 begins to flip, the outside edge is supported by the flip arm which allows the cage to stand up perpendicular to the surface of the water. The momentum of the cage 500 allows it to swing past the perpendicular position flipping the cage 500 into the water in the pontoon-float-down position. After the cage 500 flips, the operator can stop the rise of the carriage 704 as soon as it has passed the carriage stop block 144 (which is adjustable). The carriage stop block 144 prevents the carriage guide 724 from lowering which allows the operator to reverse the winch 116, taking the tension off the gears and allowing the operator to disengage the winch clutch. Once the tension is off the winch strap or cable 118, the winch clutch can be disengaged, and the operator can release the carriage stop block 144 allowing the carriage 704 to drop to the bottom of the support beam 120. The operator engages the clutch and begins another cycle by centering the next cage 500 and engaging the lifting device 106 to start an upward movement.

Figures 8, 9, 10:
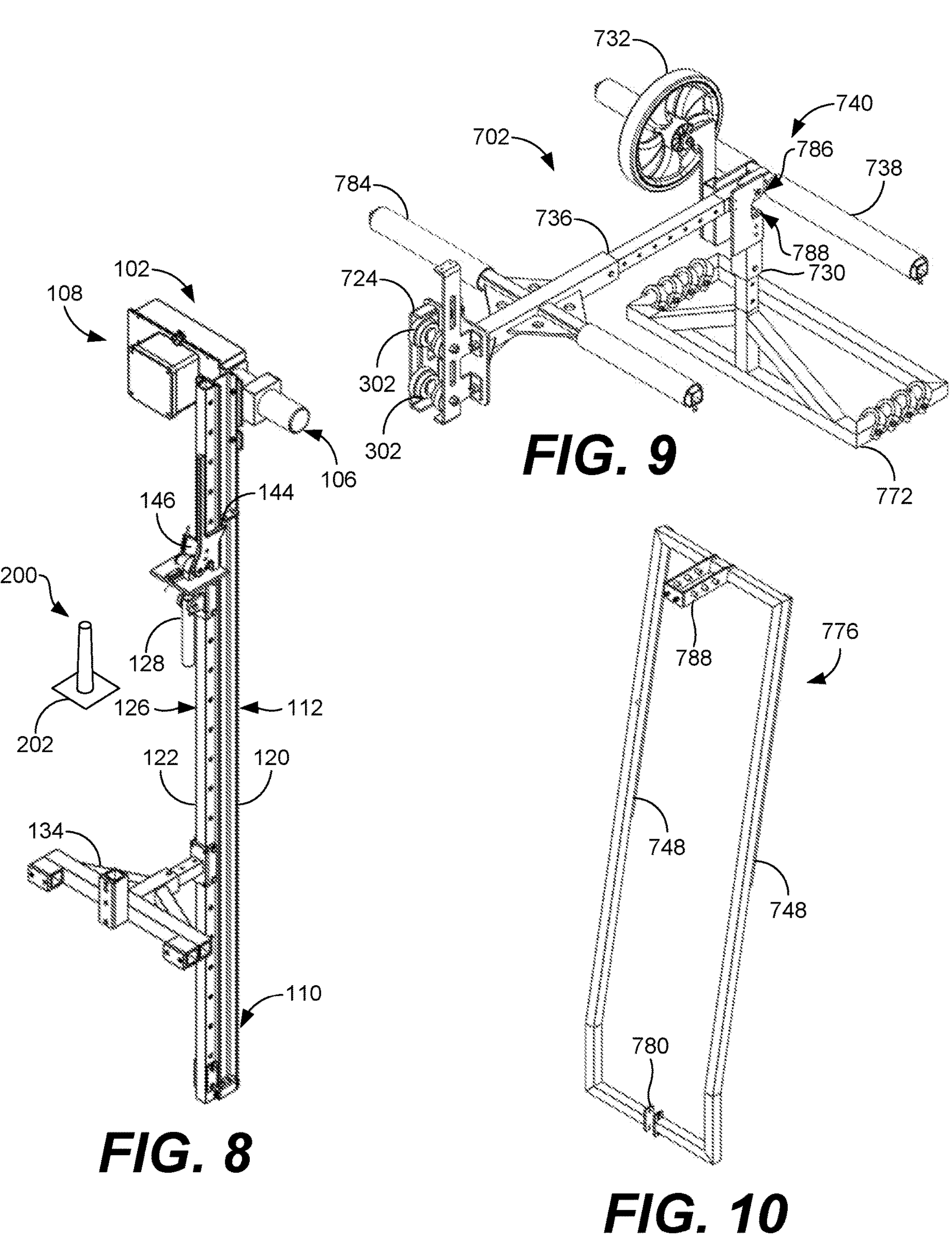
FIG. 8 illustrates the support structure of the example oyster cage flipping system of FIG. 7 according to various aspects of the embodiments of the present disclosure.
FIG. 9 illustrates the carriage of the example oyster cage flipping system of FIG. 7 according to various aspects of the embodiments of the present disclosure.
FIG. 10 illustrates the guide bars of the example oyster cage flipping system of FIG. 7 according to various aspects of the embodiments of the present disclosure.

Shown in FIG. 7 is an example oyster cage flipping system 700 in a deployed position suitable to engage an oyster cage 500 floating in the water. The oyster cage flipping system 700 can include a support structure 102 extending along a main axis (Z). The support structure 102 having a first end 108 and a second end 110. The support structure 102 configured to be deployed in water such that, when in a deployed position, the second end 110 is submerged in water and the first end 108 remains above water. A carriage 704 can be configured to travel along a first side 112 of the support structure 102 and to engage with a floating cage 500 (FIG. 11B), and a lifting device 106 configured to move the carriage 704. As shown in FIG. 10, the system 700 can include a guide bar attachment 776 with guide bars 748 that extend outward at an angle on the first side 112 of the support structure 102. In an example, the guide bars can be two outward leaning guide bars. In an example, the guide bar attachment 776 can be a frame-like structure with at least two parallel sides comprising the outward leaning guide bars 748, where a top portion of the guide bar attachment 776 is configured with an extension arm 788 to secure the guide bar attachment 776 near the first end 108 of the support structure 102 and a section 780 at the opposite bottom portion of the guide bar attachment 776 adapted to be secured to the adjustment rail 122.

The support structure 102 can include a support beam 120. In some examples, the support beam 120 can be an I-beam about 8 feet long. In some examples, the support beam 120 can have length selected for the particular boat to which it will be installed. In some examples, the length of the support beam 120 is related to the size and dimensions of the oyster cage 500. The support structure 102 is configured to be detachably attached to a boat, another water vehicle, or another structure. The support structure having first and second ends. When deployed in water, the support structure is configured to be substantially vertical with the first end 108 (considered the top) of the support structure, remaining above water and the second end 110 (considered the bottom), submerged in water.

As shown in FIGS. 7 and 9, the carriage 704 can include a carriage guide 724, a lift arm 736, a balance bar 738, a flip arm 730, a carriage wheel 732, and carriage foot 772. The carriage guide 724 can be moveably attached to the support structure on the first side of the support structure 102. The support structure 102 can include a support beam 120 to which the carriage guide 724 is moveably attached. The carriage guide 724 can have a plurality of wheels 302 to allow movement along the support structure 102. For example, the carriage guide 724 can have four wheels 302, where the carriage 704 straddles an I-beam and a pair of wheels is arranged on each side of the I-beam to stabilize the carriage 704 and to allow movement of the carriage 704. The support structure 102 can have a lower carriage stop 182 located at the second end of the support structure 102 to limit the carriage 704 from detaching from the support structure 102.

The lift arm 736 is attached to the carriage guide 724 at a proximal end of the lift arm 736 extending in a direction away from the first side of the support structure 102. In an example, the lift arm 736 can be telescoping and/or adjustable in length. The balance bar 738 is attached at the distal end 752 of the lift arm 736. A middle section 754 of the balance bar 738 is attached such that the balance bar 738 extends on both sides of the lift arm 736 which is arranged substantially perpendicular to the lift arm 736 and substantially perpendicular to the main axis of the support structure 102. When the carriage 704 is engaged to lift the cage 500, the cage can rest on the lift arm and balance bar 738. In some examples, the carriage 704 can also include a support bar 784 that is positioned near the proximal end 750 of the lift arm 736 and has a similar configuration to the balance bar 738. The support bar 784 can provide additional support for the cage 500 when positioned on the carriage 704. A flip arm 730 can be pivotably attached at the distal end of the lift arm 736. The flip arm 730 can be configured to rotate about the axis of the balance bar 738. The carriage wheel 732 is attached to a distal end 752 of the flip arm 730. The carriage wheel 732 is configured to rotate about a wheel axis (A) that is substantially parallel to the axis of the balance bar 738. The carriage foot 772 can include a frame that extends in a direction substantially perpendicular to the flip arm 730 and is configured to engage with at least an edge of the cage 500.

Figures 11A, 11B:
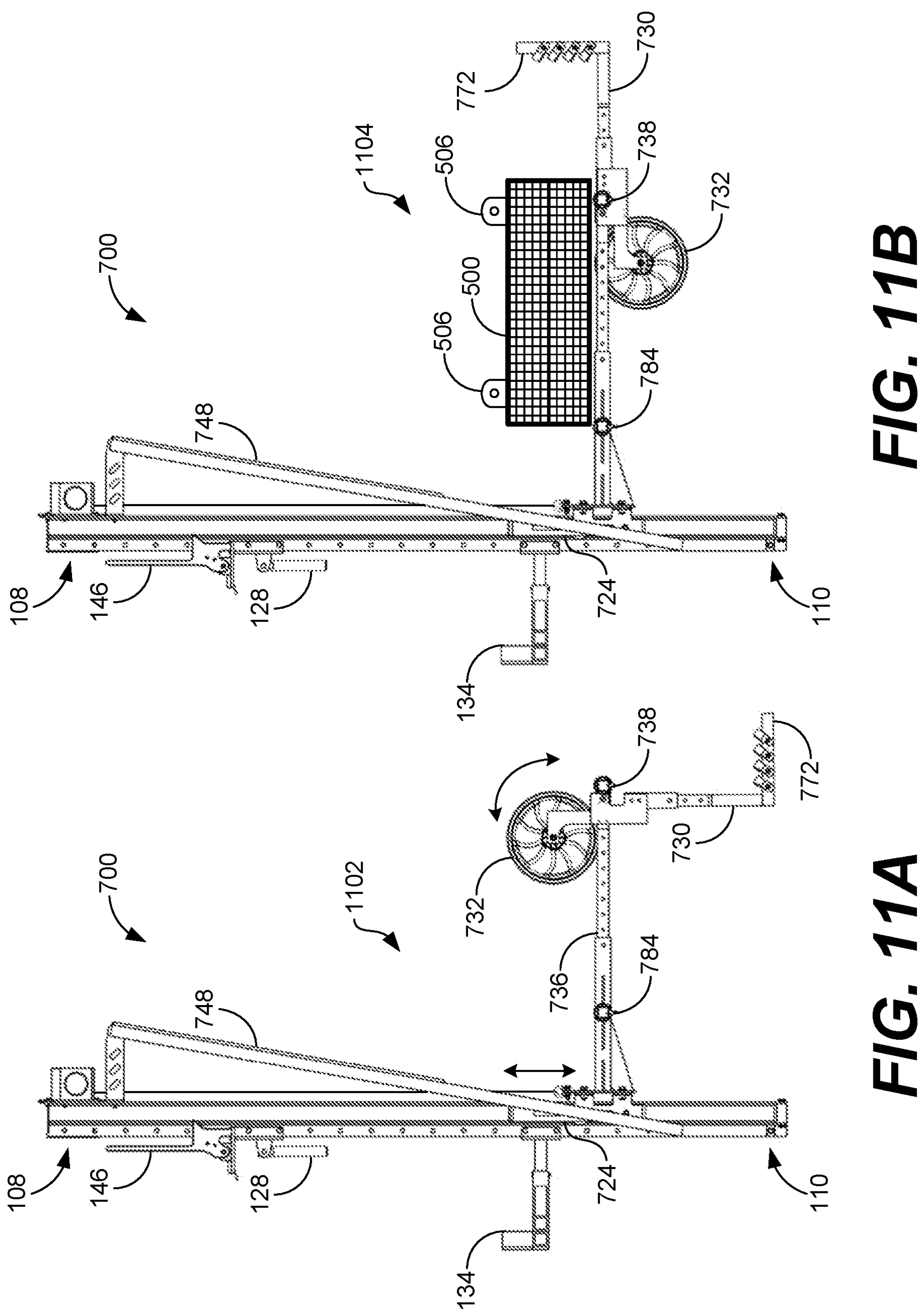
FIG. 11A illustrates the example oyster cage flipping system of FIG. 7 with the flip arm in a release position according to various aspects of the embodiments of the present disclosure.
FIG. 11B illustrates the example oyster cage flipping system of FIG. 7 with the flip arm in a lifting position and engaged with a cage according to various aspects of the embodiments of the present disclosure.

As shown in FIGS. 11A and 11B, when the oyster cage flipping system 700 is deployed, the flip arm 730 is configured to move from a first position 1102, where the carriage 704 is not engaged with the cage 500, to a second position 1104, where the carriage 704 is engaged with the cage 500. In the first position 1102, the carriage foot 772 extends in a direction away from the first side 112 of the support structure 102. In the second position 1104, the carriage foot 772 is substantially parallel to the support structure 102. The carriage foot 772 can have a frame 774, such as a rectangular frame, extending in a substantially perpendicular direction from the flip arm 730. While the carriage 704 is positioned at the same level in both FIGS. 11A and 11B as shown, it can be understood that the carriage 704 and flip arm 730 of FIG. 11A are positioned under a floating cage 500 before the carriage 704 is translated to contact and engage with the cage 500 to be in the position of FIG. 11B.

As shown in FIG. 8, the oyster cage flipping system 700 may include a boat brace 134 attached to the support structure 102 on a second side 126 of the support structure 102 opposite to the first side 112 of the support structure 102. The boat brace 134 can have a portion that is adjustable. The support structure 102 may further include an adjustment rail 122 attached to the support beam 120 on a second side 126 of the support structure 102 opposite to the first side 112 of the support structure 102. The support structure 102 is configured to be detachably attached to a boat (not shown) via a boat attachment coupler 200, where a first coupler portion 128 of the coupler 200 is attached to the support structure 102 and a second coupler portion 202 of the coupler 200 is attached directly or indirectly to the boat. The boat brace 134 can be detachably secured to the support structure 102 and the position of the boat brace 134 can be adjusted along the adjustment rail 122. The boat brace 134 is configured to abut against the exterior side of the boat to stabilize the support structure 102. The boat brace 134 can be detachably attached to the adjustment rail 122. In some examples, the oyster cage flipping system 700 can additionally be secured to the boat by a fastener, such as a bolt extending through a hole in the boat and secured by a nut.

The oyster cage flipping system 700 may include a boat attachment coupler 200 that may include a first coupler portion 128 of the coupler 200 attached to the support structure 102 and a second coupler portion 202 of the coupler 200 that is attached to a portion of a boat. In an example, the first portion 128 of the coupler 200 attached to the support structure can be an adjustable male attachment or pin and the second coupler portion 202 of the coupler 200 attached to the boat can be a female attachment or seat configured to receive the pin. The first portion 128 of the coupler 200 can be detachably attached to the adjustment rail 122. The coupler 200 can be configured to detachably attach the support structure 102 to the boat in a secure manner. The coupler 200 can be configured to allow movement of the support structure 102 between a stowed position, where the system 700 is on the boat and removed from the water, to the deployed position, where the system 700 is deployed in the water.

The lifting device 106 can include a winch 116 and a cable 118. The winch can have a cable 118 or strap configured to be connected to the carriage 704. For example, the winch 116 can be a 12-volt winch configured to dead lift 500 lbs. The winch 116 can be attached to the first end of the support structure. The cable 118 can retractably extend from the winch 116 and be attached to the carriage guide. The cable 118 can have a length to extend the carriage guide to a carriage stop position a distance from the second end of the support structure. The lifting device 106 can further include a clutch configured to be engaged or disengaged. When the clutch is engaged, the winch 116 operates to retract the cable 118 and move the carriage 704 toward the first end of the support structure. When the clutch is disengaged, the tension on the cable 118 is released and the carriage 704 is allowed to drop into the water to the bottom or second end of the support structure as the cable free wheels on the winch 116. The system 700 may include a carriage stop block 144 positioned at a catch distance from the first end of support structure. The carriage stop block 144 can be configured to prevent the carriage from lowering. When the carriage guide 724 is positioned at the carriage stop block 144, tension is released from the cable 118, allowing the winch 116 to be disengaged. The carriage stop block 144 may include a carriage release lever 146 with a catch, where the catch stops movement of the carriage 704 at a catch distance from the winch 116 and allows an operator to disengage the clutch.

Since the oyster cage flipping system 700 is configured to be attached to a boat floating in the water, a coordinate system can be considered relative to the main axis (Z) of the support structure 102. Since the boat is floating on the water and the system is mounted on the boat, the oyster cage flipping system may not remain stationary and can move with the pitch, roll, and yaw of the boat. When the system 700 is deployed with the second end 110 of the support structure 102 in the water, the support structure 102 extending along a z-axis is substantially vertical. The first end 108 being out of the water can be considered the top and the second end 110 can be considered the bottom. Thus, the movement of the carriage 704 can be understood to be lifting the carriage and/or carriage and cage in an upward movement toward the top, or the first end 108 of the support structure 102. As can be understood the term boat used herein is considered a generalized term for a watercraft and can include boats, barges, and any floating platforms.

With respect the z-axis of the support structure, the first arm or stationary arm, also called the lift arm 736 herein, extends in a direction away from the support structure along an x-axis. In a resting position, the second arm, also called the flip arm 730 herein, can be initially substantially parallel to the z-axis, with the weight of the carriage foot 772 positioning the arm by gravity. Without weight applied to the second arm, it can move freely with the water. When the carriage 704 is positioned under a floating cage 500, the carriage wheel 732 is configured to make the first contact with the cage 500 such that the second arm pivots to align in the same plane as the first arm and balance bar 738. The carriage foot 772 being configured to catch an outside edge of the cage 500 as the carriage 704 continues to rise.

Figure 12:
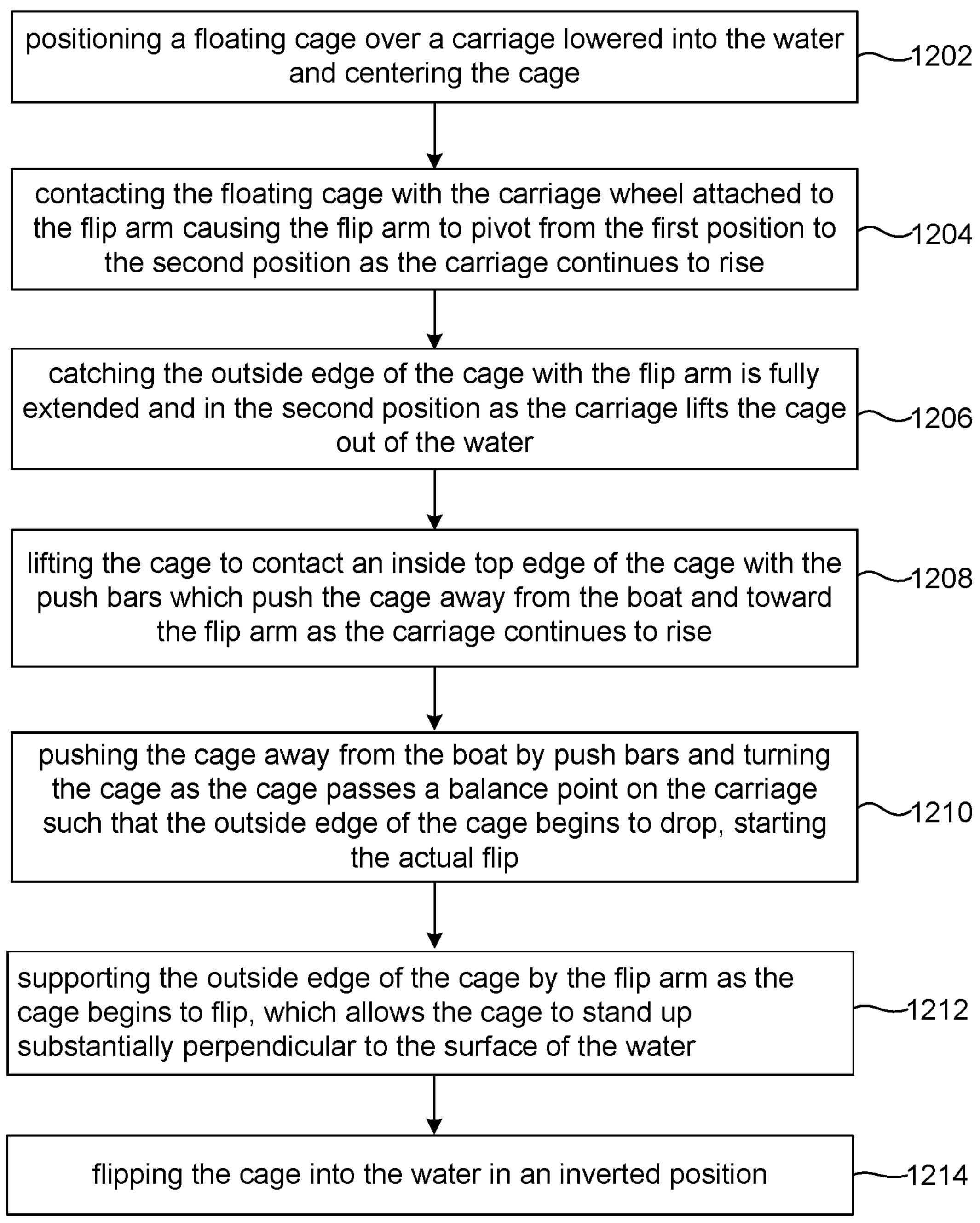
FIG. 12 illustrates an example method for flipping a floating oyster cage using the oyster cage flipping system of FIG. 7 according to various embodiments described herein.

An example method for flipping a floating oyster cage using the oyster cage flipping system 700 is shown in FIG. 12. At box 1202, positioning a floating cage over a carriage lowered into the water and centering the cage; activating the lifting device 106 to raise the carriage toward the cage floating in the water. At box 1204, contacting the floating cage with the carriage wheel attached to the flip arm causing the flip arm to pivot from the first position to the second position as the carriage continues to rise. At box 1206, catching the outside edge of the cage with the flip arm is fully extended and in the second position as the carriage lifts the cage out of the water. At box 1108, lifting the cage to contact an inside top edge of the cage with the guide bars which push the cage away from the boat and toward the flip arm as the carriage continues to rise. At box 1210, pushing the cage away from the boat by guide bars and turning the cage as the cage passes a balance point on the carriage such that the outside edge of the cage begins to drop, starting the actual flip. At box, 1212, supporting the outside edge of the cage by the flip arm as the cage begins to flip, which allows the cage to stand up substantially perpendicular to the surface of the water. At box 1214, flipping the cage into the water in an inverted position. After the cage flips, the method can include stopping upward movement of the carriage after passing the carriage stop block. The method can include disengaging the clutch of the lifting device 106 to allow the carriage to drop into the water. The method can also include adjusting the length of the carriage lift arm 736 to correspond with the size of the cage.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure. Any recited method can be carried out in the order of events recited or in any other order that is logically possible.

In addition to the foregoing, the various embodiments of the present disclosure include, but are not limited to, the embodiments set for in the following clauses.

Clause 1. A system comprising: a support structure extending along a main axis, the support structure having a first end and a second end, the support structure configured to be deployed in water such that, when in a deployed position, the second end is submerged in water and the first end remains above water; a carriage configured to travel along a first side of the support structure and to engage with a cage floating in water, and a lifting device configured to move the carriage.

Clause 2. The system of clause 1, wherein the carriage comprises: a carriage guide moveably attached to the support structure on the first side of the support structure, a lift arm attached to the carriage guide at a proximal end of the lift arm extending in a direction away from the first side of the support structure, a balance bar attached at the distal end of the lift arm, a middle section of the balance bar attached such that the balance bar extends on both sides of the lift arm is arranged substantially perpendicular to the lift arm and substantially perpendicular to the main axis of the support structure, and a flipping apparatus coupled to the lift arm.

Clause 3. The system of clause 1 or 2, wherein the flipping apparatus comprises: a carriage table coupled to the balance bar at the distal end of the lift arm such that the carriage table rotates about a rotation axis of the balance bar, the carriage table comprising a lifting frame adapted to allow water to flow through the lifting frame; and a carriage foot comprising a frame that extends in a direction substantially perpendicular to the plane of the carriage table and configured to engage with at least an edge of the cage.

Clause 4. The system of any one of clauses 1 to 3, wherein when the system is deployed, the carriage table is configured to move from a release position, where the carriage is not engaged with the cage, to a lifting position, where the carriage is engaged with the cage.

Clause 5. The system of any one of clauses 1 to 4, wherein the carriage foot further comprises a flotation device, wherein when deployed in water, the floatation device floats upward causing the carriage table to move from the release position to the lifting position.

Clause 6. The system of any one of clauses 1 to 5, wherein the carriage further comprises a latch and a latch plate suitable to secure the carriage table in the lifting position for lifting the cage.

Clause 7. The system of any one of clauses 1 to 6, further comprising guide bars that extend outward on the first side of the support structure, the guide bars configured to center and stabilize the cage.

Clause 8. The system of any one of clauses 1 to 7, further comprising a boat attachment coupler comprising a first portion of the coupler attached to the support structure and a second portion of the coupler is attached to a portion of a boat, the coupler configured to detachably attach the support structure to the boat in a secure manner, the coupler configured to allow movement of the support structure between a stowed position to the deployed position.

Clause 9. The system of any one of clauses 1 to 8, further comprising a boat brace attached to the support structure on a second side of the support structure opposite to the first side of the support structure.

Clause 10. The system of clause 9, wherein the boat brace has a portion that is adjustable.

Clause 11. The system of any one of clauses 1 to 10, wherein the support structure comprises a support beam to which the carriage guide is moveably attached.

Clause 12. The system of clause 11, wherein the support structure further comprises an adjustment rail attached to the support beam on a second side of the support structure opposite to the first side of the support structure, wherein the first portion of the coupler, a boat brace, or both can be detachably attached to the adjustment rail.

Clause 13. The system of any one of clauses 1 to 12, wherein the lifting system comprises a winch and a cable, the winch attached to the first end of the support structure, the cable retractably extending from the winch and attached to the carriage guide, the cable having a length to extend the carriage guide to a carriage stop position a distance from the second end of the support structure.

Clause 14. The system of clause 13, wherein the lifting system further comprises a clutch, the clutch configured to be engaged or disengaged, when the clutch is engaged, the winch operates to retract the cable and move the carriage toward the first end of the support structure, when the clutch is disengaged, the tension on the cable is released and the carriage allowed to drop into the water to the bottom or second end of the support structure as the cable free wheels on the winch.

Clause 15. The system of clause 14, further comprising a carriage stop block positioned at a catch distance from the first end of support structure, the carriage stop block configured to prevent the carriage from lowering, when the carriage guide is positioned at the stop block, tension is released from the cable, allowing the winch to be disengaged.

Clause 16. The system of clause 14, further comprising a lever with a catch, where the catch stops movement of the carriage at a catch distance from the winch and allows an operator to disengage the clutch.

Clause 17. A method for flipping a floating oyster cage using the system of clause 1, the method comprising: positioning a carriage lowered into the water beneath the floating cage and centering the cage over the carriage table; activating the lifting system to raise the carriage toward the cage floating in the water; contacting the floating cage the carriage table, the carriage table being latched in the lifting position as the carriage continues to rise; stabilizing the cage against the guide bars as the as the carriage lifts the cage out of the water; lifting the cage out of the water; releasing a latch to allow the carriage table to pivot to a release position; and flipping the cage into the water to an inverted position.

Clause 18. The method of clause 17, wherein after the cage flips, the method further comprising: stopping upward movement of the carriage the rise of the carriage after passing the carriage stop block.

Clause 19. The method of clause 17 or 18, further comprising disengaging the clutch of the lifting system to allow the carriage to drop into the water.

Clause 20. The method of any one of clauses 17 to 19, further comprising adjusting the length of the carriage table to correspond with the size of the cage.

Clause 21. A system comprising: a support structure extending along a main axis, the support structure having a first end and a second end, the support structure configured to be deployed in water such that, when in a deployed position, the second end is submerged in water and the first end remains above water; a carriage configured to travel along a first side of the support structure and to engage with a cage floating in water, and a lifting device configured to move the carriage.

Clause 22. The system of clause 21, wherein the carriage comprises: a carriage guide moveably attached to the support structure on the first side of the support structure, a lift arm attached to the carriage guide at a proximal end of the lift arm extending in a direction away from the first side of the support structure, a balance bar attached at the distal end of the lift arm, a middle section of the balance bar attached such that the balance bar extends on both sides of the lift arm is arranged substantially perpendicular to the lift arm and substantially perpendicular to the main axis of the support structure, and a flipping apparatus coupled to the lift arm.

Clause 23. The system of clause 21 or 22, wherein the flipping apparatus comprises: a flip arm pivotably attached at the distal end of the lift arm, the flip arm configured to rotate about a rotation axis that is substantially parallel to the balance bar, a carriage wheel attached to a first end of the flip arm, the carriage wheel configured to rotate about a wheel axis that is substantially parallel to the axis of the balance bar, and a carriage foot comprising a frame that extends in a direction substantially perpendicular to the flip arm and configured to engage with at least an edge of the cage.

Clause 24. The system of any one of clauses 21 to 23, wherein when the system is deployed, the flip arm is configured to move from a release position, where the carriage is not engaged with the cage, to a lifting position, where the carriage is engaged with the cage.

Clause 25. The system of clause 24, wherein in the release position, the carriage foot extends in a direction away from the first side of the support structure and in the lifting position, the carriage foot is substantially parallel to the support structure.

Clause 26. The system of any one of clauses 21 to 25, wherein the lift arm is an adjustable telescoping arm.

Clause 27. The system of any one of clauses 21 to 26, further comprising guide bars that extend outward on the first side of the support structure at an angle.

Clause 28. The system of any one of clauses 21 to 27, further comprising a boat attachment coupler comprising a first portion of the coupler attached to the support structure and a second portion of the coupler is attached to a portion of a boat, the coupler configured to detachably attach the support structure to the boat in a secure manner, the coupler configured to allow movement of the support structure between a stowed position to the deployed position.

Clause 29. The system of any one of clauses 21 to 28, further comprising a boat brace attached to the support structure on a second side of the support structure opposite to the first side of the support structure.

Clause 30. The system of clause 29, wherein the boat brace has a portion that is adjustable.

Clause 31. The system of any one of clauses 21 to 30, wherein the support structure comprises a support beam to which a carriage guide is moveably attached.

Clause 32. The system of clause 31, wherein the support structure further comprises an adjustment rail attached to the support beam on a second side of the support structure opposite to the first side of the support structure, wherein the first portion of the coupler, a boat brace, or both can be detachably attached to the adjustment rail.

Clause 33. The system of any one of clauses 21 to 32, wherein the lifting system comprises a winch and a cable, the winch attached to the first end of the support structure, the cable retractably extending from the winch and attached to the carriage guide, the cable having a length to extend the carriage guide to a carriage stop position a distance from the second end of the support structure.

Clause 34. The system of clause 33, wherein the lifting system further comprises a clutch, the clutch configured to be engaged or disengaged, when the clutch is engaged, the winch operates to retract the cable and move the carriage toward the first end of the support structure, when the clutch is disengaged, the tension on the cable is released and the carriage allowed to drop into the water to the bottom or second end of the support structure as the cable free wheels on the winch.

Clause 35. The system of clause 34, further comprising a carriage stop block positioned at a catch distance from the first end of support structure, the carriage stop block configured to prevent the carriage from lowering, when the carriage guide is positioned at the stop block, tension is released from the cable, allowing the winch to be disengaged.

Clause 36. The system of clause 34, further comprising a lever with a catch, where the catch stops movement of the carriage at a catch distance from the winch and allows an operator to disengage the clutch.

Clause 37. A method for flipping a floating oyster cage using the system of clause 21, the method comprising: positioning a floating cage over a carriage lowered into the water and centering the cage; activating the lifting system to raise the carriage toward the cage floating in the water; contacting the floating cage with the carriage wheel attached to the flip arm causing the flip arm to pivot from the release position to the lifting position as the carriage continues to rise; catching the outside edge of the cage with the flip arm is fully extended and in the lifting position as the carriage lifts the cage out of the water; lifting the cage to contact an inside top edge of the cage with the guide bars which push the cage away from the boat and toward the flip arm as the carriage continues to rise; pushing the cage away from the boat by guide bars and turning the cage as the cage passes a balance point on the carriage such that the outside edge of the cage begins to drop, starting the flip; supporting the outside edge of the cage by the flip arm as the cage begins to flip, which allows the cage to stand up substantially perpendicular to the surface of the water; and flipping the cage into the water in an inverted position.

Clause 38. The method of clause 37, wherein after the cage flips, the method further comprising: stopping upward movement of the carriage the rise of the carriage after passing the carriage stop block.

Clause 39. The method of clause 37 or 38, further comprising disengaging the clutch of the lifting system to allow the carriage to drop into the water.

Clause 40. The method of any one of clauses 37 to 39, further comprising adjusting the length of the lift arm to correspond with the size of the cage.

It should be emphasized that the above-described examples of the present disclosure are merely possible examples of implementations set forth for a clear understanding of the principles of the disclosure. Many variations and modifications can be made without departing substantially from the spirit and principles of the disclosure. All such modifications and variations are intended to be included herein within the scope of this disclosure and protected by the following claims.

The invention claimed is:

1. A system comprising:

a support structure extending along a main axis, the support structure having a first end and a second end, the support structure configured to be deployed in water such that, when in a deployed position, the second end is submerged in water and the first end remains above water;

a carriage configured to travel along a first side of the support structure and to engage with a cage floating in water; and a lifting device configured to move the carriage;

wherein the carriage comprises:

a carriage guide moveably attached to the support structure on the first side of the support structure;

a lift arm attached to the carriage guide at a proximal end of the lift arm extending in a direction away from the first side of the support structure;

a balance bar attached at a distal end of the lift arm, a middle section of the balance bar attached to the lift arm such that the balance bar extends on a first side and a second side of the lift arm, is arranged substantially perpendicular to the lift arm, and is substantially perpendicular to a main axis of the support structure; and a flipping apparatus coupled to the lift arm;

wherein the flipping apparatus comprises:

a carriage table coupled to the balance bar at the distal end of the lift arm such that the carriage table rotates about a rotation axis of the balance bar, the carriage table comprising a lifting frame adapted to allow water to flow through the lifting frame; and a carriage foot comprising a frame that extends in a direction substantially perpendicular to a plane of the carriage table and configured to engage with at least an edge of the cage.

2. The system of claim 1, wherein when the system is deployed, the carriage table is configured to move from a release position, where the carriage is not engaged with the cage, to a lifting position, where the carriage is engaged with the cage.

3. The system of claim 2, wherein the carriage foot further comprises a flotation device, wherein when deployed in water, the flotation device floats upward causing the carriage table to move from the release position to the lifting position.

4. The system of claim 2, wherein the carriage further comprises a latch and a latch plate suitable to secure the carriage table in the lifting position for lifting the cage.

5. The system of claim 1, further comprising a plurality of guide bars that extend outward on the first side of the support structure, the guide bars configured to center and stabilize the cage.

6. The system of claim 1, further comprising a boat brace attached to the support structure on a second side of the support structure opposite to the first side of the support structure.

7. The system of claim 6, wherein the boat brace has a portion that is adjustable.

8. The system of claim 1, wherein the system further comprises a boat attachment coupler comprising a first portion of the coupler attached to the support structure and a second portion of the coupler is attached to a portion of a boat, the coupler configured to detachably attach the support structure to the boat in a secure manner, the coupler configured to allow movement of the support structure between a stowed position to the deployed position, wherein the support structure comprises a support beam to which the carriage guide is moveably attached.

9. The system of claim 8, wherein the support structure further comprises an adjustment rail attached to the support beam on a second side of the support structure opposite to the first side of the support structure, wherein the first portion of the coupler, a boat brace, or both can be detachably attached to the adjustment rail.

10. A system comprising:

a support structure extending along a main axis, the support structure having a first end and a second end, the support structure configured to be deployed in water such that, when in a deployed position, the second end is submerged in water and the first end remains above water;

a carriage configured to travel along a first side of the support structure and to engage with a cage floating in water; and a lifting device configured to move the carriage;

wherein the lifting device comprises a winch and a cable, the winch attached to the first end of the support structure, the cable retractably extending from the winch and attached to a carriage guide moveably attached to the support structure on the first side of the support structure, the cable having a length to extend the carriage guide to a carriage stop position a distance from the second end of the support structure;

wherein the lifting device further comprises a clutch, the clutch configured to be engaged or disengaged, when the clutch is engaged, the winch operates to retract the cable and move the carriage toward the first end of the support structure, when the clutch is disengaged, tension on the cable is released and the carriage is allowed to drop into the water to a bottom or second end of the support structure as the cable free wheels on the winch.

11. The system of claim 10, further comprising a carriage stop block positioned at a catch distance from the first end of support structure, the carriage stop block configured to prevent the carriage from lowering, when the carriage guide is positioned at the stop block, tension is released from the cable, allowing the winch to be disengaged.

12. The system of claim 10, further comprising a lever with a catch, where the catch stops movement of the carriage at a catch distance from the winch and allows an operator to disengage the clutch.

* * * * *